Figure 1:
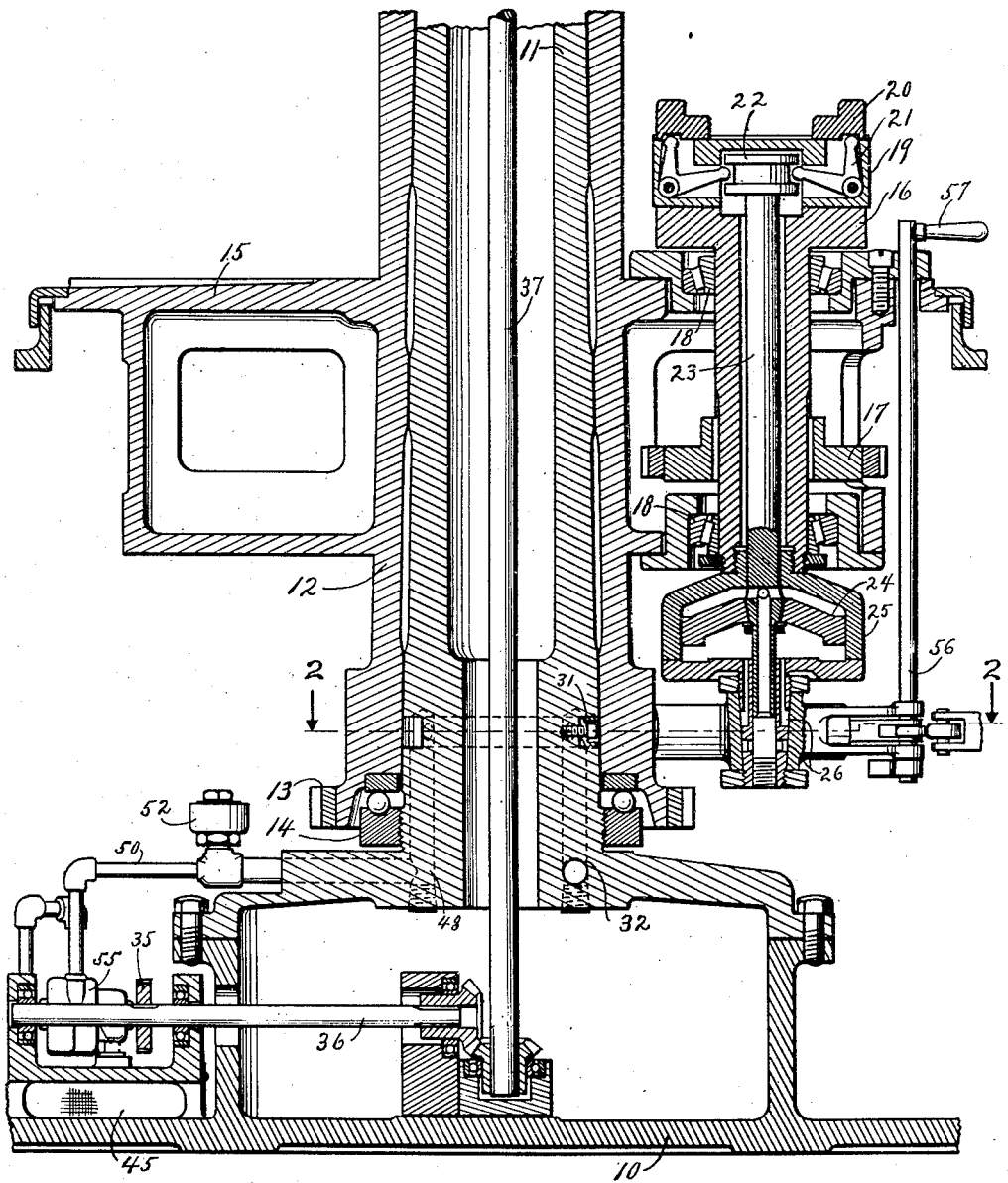

INVENTOR.
EDWARD P. BULLARD
GUSTAF R. APPELBERG

INVENTOR.
EDWARD P. BULLARD
GUSTAF R. APPELBERG
BY A.T. Sperry
ATTORNEYS.

UNITED STATES PATENT OFFICE 2,122,356

FLUID CHUCK OPERATING MECHANISM

Edward P. Bullard, Fairfield, and Gustaf R. Appelberg, Bridgeport, Conn., assignors to The Bullard Company, a corporation of Connecticut Application November 27, 1935, Serial No. 51,736

5 Claims. (Cl. 29—38)

This invention relates to fluid chuck operating devices for multiple spindle machine tools.

One of the objects of the invention is to provide a chuck operating mechanism for machine tools which automatically and efficiently provides for synchronized opening and closing of chuck jaws in relation to the orbital movement of the chucks during the operation of the machine.

Another object of the invention is to provide a fluid actuated chuck mechanism which may be either automatically or manually operable at the will of the operator.

Another object of the invention is to provide for maintenance of chuck jaw pressure in accordance with the operations which are performed by the machine.

Another object of the invention is to provide chuck operating means in which variations in chuck jaw pressures may be provided for without danger of permitting displacement of the work pieces during such changes of pressure.

A further object of the invention is to provide fluid pressure chuck operating means for multiple chuck mechanisms which will maintain constant pressure upon the chuck jaws during the working cycle; and which will further provide for the spasmodic pressure required during the loading or unloading operations, the same being operable to permit such loading and unloading without affecting the pressure as applied to other spindles.

In that form of the invention herein shown by way of illustration, the invention is applied to machine tools which are characterized by the provision of a rotatable table carrying a plurality of work holders. For purpose of illustration, the invention has been shown as applied to a machine of the general type shown in United States Letters Patent, No. 1,574,726, in which the table is continuously moved and carries in it a group of individually rotatable work holding spindles, the work being chucked therein and continuously moved in an orbital path, while tool heads, not shown, are operated to perform the desired operation on the work. Obviously the invention is equally applicable to station type machines.

The chuck jaws of each work holder are operated through a reciprocating rod in the spindle, which rod is moved by a fluid pressure cylinder and piston arrangement to open and close the chuck jaws during a predetermined phase of the orbital movement. The pressure to each individual cylinder is provided for by means of a valve mechanism which may be operated either by hand convenient to the operator or by cam means stationary with respect to rotation of the table. The pressure for the cylinders is supplied to the valves through an annular chamber in the central column about which the table rotates.

An important feature of the invention is that the annular chamber is divided into two or more sub-chambers which are individually supplied by pressure, the arrangement being such that, at the loading sector, pressure may be supplied from an accumulator so that the requirements for pressure may be beyond that delivered to the accumulator from the pump. Another sector of the chamber may be supplied directly from a pump without an accumulator. The independence of these sub-chambers, one from another, provides for a continuous maintenance of even pressure during the working cycle which pressure is not subjected to fluctuations due to the opening and closing of the jaws at the loading station.

Another feature of the invention is an additional division of the annular chamber from which the cylinders are provided with pressure so that the pressure applied to the jaws during the working operations may be commensurate with the type of work being done. Thus, during a roughing operation, a high pressure may be applied to the chucks while a lighter pressure may be applied for the finishing operation.

Figure 2:
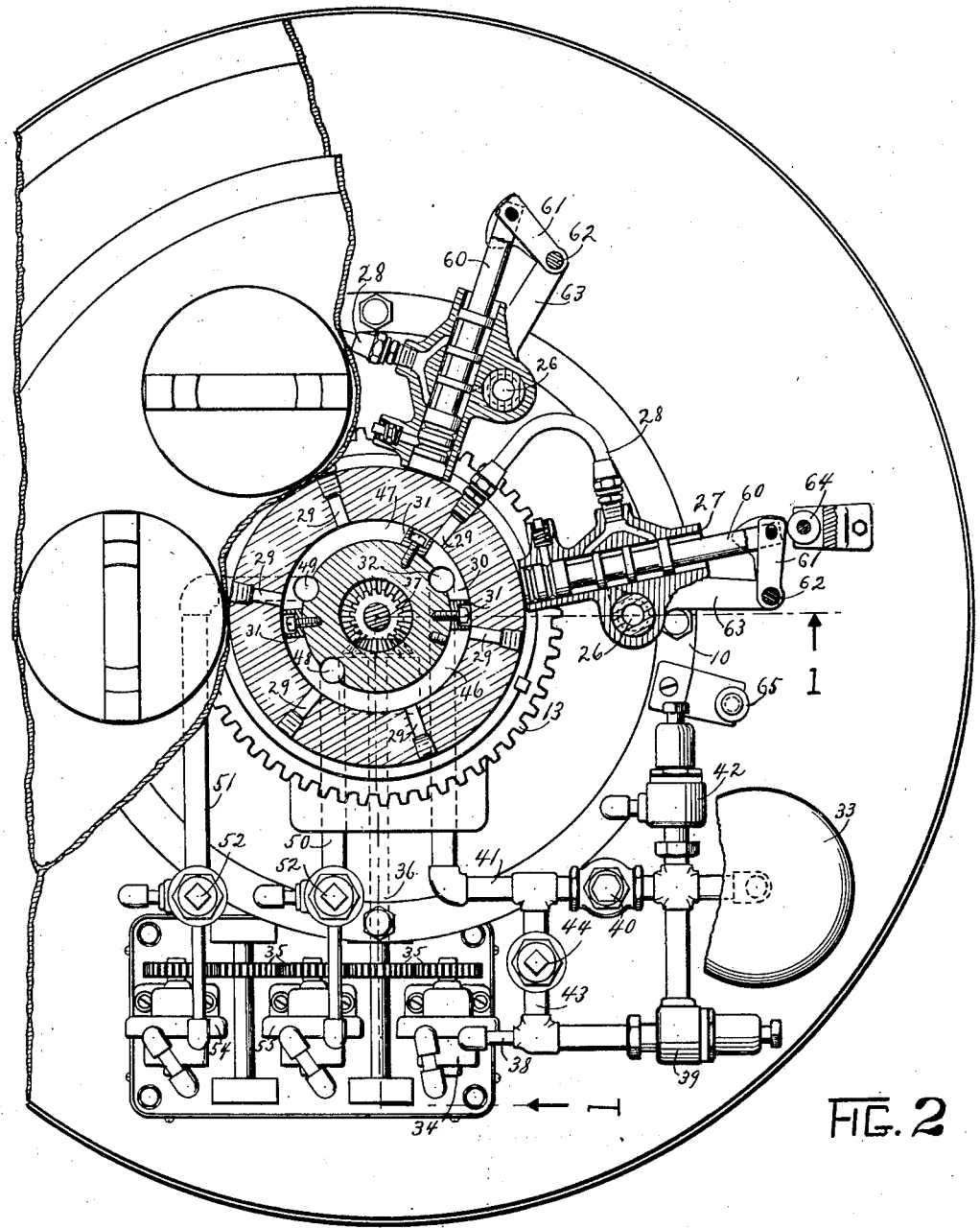

Further details of the practical embodiment of the invention may be found from a consideration of the drawings in which:

Figure 1 is a vertical, fragmentary section through one form of machine tool to which the invention is applicable, a section being taken on the angular line 1—1 of Figure 2; and Figure 2 is a horizontal section through that same embodiment of the invention taken on the line 2—2 of Figure 1.

Referring in detail to the drawings, the number 10 indicates the base of a multiple operation machine tool. The base 10 includes a vertically extending central column 11 upon which is mounted a rotary carrier 12 which may be suitably driven, either constantly or periodically, through means of a suitable mechanism such, for instance, as a gear 13. The carrier 12 preferably has a bearing on the external face of the column 11 and may rest upon a suitable roller bearing assembly as indicated at 14. The carrier 12 includes an outstanding flanged-like table 15 through which are mounted spindles 16 which may be driven in any suitable manner, such as through a gear 17; it being understood that the mounting of the spindle, as by bearings 18, is a matter of discretion, the invention being applicable to machines having no rotary movement of the work as well as to those having work spindles as here shown.

The spindle 16 is preferably of hollow construction and is surmounted by a spindle head 19 carrying movable chuck jaws 20, which are designed to be operated by bell crank levers 21 engageable with the chuck jaws 20 and with the head 22 of an operating rod 23 which extends through the spindle and terminates at its lower end with an operating piston 24 mounted within a cylinder 25.

The ingress and egress of the fluid to the cylinder 25 is provided through valve controlled passages as indicated at 26; these passages being controlled by a valve 27 so arranged as to determine whether the piston moves upwardly or downwardly in accordance with the positioning of the valve. In this connection it will be understood that the invention is not confined to the structure of the valve or to the passages to the cylinder. Obviously, other arrangements of valves and passages may be used without departing from the spirit and scope of the invention.

In the assembly shown, each spindle is provided with its own cylinder and valve assembly, all of which rotate around the machine in an orbital path with the spindle. Fluid is supplied to the valve chamber through individual conduits 28 for each valve, each conduit leads to a bore 29 tapped through the carrier 12; the inner ends of which register with an annular recess formed in the column 11 which recess constitutes an annular chamber which is sub-divided into individual sectors, 30, 46 and 47, by means of adjustable divisioning pieces 31, each sector being supplied independently with the operating medium (preferably an incompressible fluid such as oil).

This arrangement is such that each individual sector communicates with one or more of the valve chambers during the passage of the chucks during their rotary movement around the machine. Thus, though the pressure supplied may be from different sources and of different degrees, the valve chambers are, at all times, in communication with a source of pressure particularly suitable to their needs as determined by their position. For the loading sub-chamber, which is indicated at 30, pressure is supplied through a channel 32 from an accumulator tank 33 which is supplied by a pump 34 driven through gears 35 and shaft 36 from a central continuously rotating driving shaft 37. For this loading sub-chamber, the pump 34 delivers fluid through its discharge pipe 38, past a check valve 39 to the accumulator 33. The fluid is supplied from the accumulator 33, past check valve 40 and pipe 41 to the passage 32. A suitable relief valve 42 is also provided to permit discharge of excess fluid when the pressure pumped is too great. A passage 43 is also provided between the discharge pipe 38 and the pipe 41 which passage is controlled by a check valve 44 so as to provide pressure to the sub-chambers 30 independent of the accumulator. This arrangement of valves and passages provides for the immediate delivery of fluid under pressure from the pump to the passage 32 through the check valve 44 even though the accumulator is not up to the required pressure. This arrangement also maintains a pressure for the passage 32 even though the pump ceases functioning since the check valves 44 and 39 preclude a dissemination of fluid backwards through the pump; and, in addition, the valve 40 precludes a drop in pressure in the sub-chamber 30 even though the pressure in the accumulator 33 is diminished. When the determined pressure has been acquired in the accumulator the relief valve 42 opens and excess fluid is returned to a sump. In this connection, it may be noted that the structure of the base of the machine is such as to act as an oil reservoir. A sump intake for the pumps is provided for by a screened sump chamber 45.

The annular recess of the column is divided by individually adjustable stops 31 to provide other individual sectors designed to communicate with cylinders as the table carries the spindles through the working phase of its orbital movement. Each of these chambers, which are indicated at 46 and 47, is supplied individually by pressure through ducts 48 and 49, respectively, from pipes 50 and 51 which are supplied by pressure past check valves 52 and 53 directly from pumps 54 and 55; the arrangement being such that the pressure supplied from the pumps 54 and 55 may be different so that the pressure in the sector 46 may be greater or less than the pressure in sector 47. Thus, for roughing operations, the sector 46 may provide a higher gripping pressure for the chuck jaws than is required during the finishing operation at which time the cylinders are in communication with the sector 47.

This arrangement and sub-division of the annular recess is thus seen to provide for the automatic delivery to the various valve chambers of independent pressures particularly appropriate for the needs of the chuck operator during each particular phase of its movement with the table around the column. The adjustability of the stops 31 permits a ready variation in the length of the sub-chambers and thus the length of phase for any particular pressure to which the chamber is subjected during the rotary movement of the work holders. Further, the adjustable stops permit the use of any number of such sub-chambers to accommodate specific requirements.

An important feature of the invention is the provision of automatic means for controlling the valves themselves. While the invention is not concerned with the type of valve, it is concerned with means for operating the valve regardless of its type. Thus, in the construction shown, a valve operating stem 60 is illustrated as being provided with an operating arm 61 pivotally secured as at 62 to a bracket-like extension 63 carried by and with the valve housing.

As this valve operating mechanism moves in an orbital path with the table, the operating arm 61 will engage a fixed operating roller 64. As the chuck approaches the loading sector, the roller 64 will move the valve stem 60 inwardly, thus reversing the pressure on the piston 24 causing it to open the chuck jaws and automatically releasing the work. Further continued movement of the carrier brings the inner face of the arm 61 in contact with a valve moving roller 65 bolted to the base 10 of the machine, the action of which is the reverse of that of the roller 64. The valve stem 60 is moved outwardly thus applying opposite pressure in the cylinder and being thus adapted to automatically move the chucks to secure work which has been placed therebetween.

The invention is obviously not confined to this or any other specific arrangement of cam valve operators; and, by way of illustrating the various means which may be utilized for operating the chuck jaws, manual operating means may be employed with or independently of the cam operating means. Thus, the operating arm 61 may be mounted upon a vertical rising operating rod 56 which terminates in a handle 57 adjacent to the chuck and in the table 15 of the carrier. Thus, the control of the valve may be manual, either with or independently of any mechanical operating means such as the rollers 64 and 65.

From a consideration of the foregoing specification, it will be seen that the invention provides a novel, simple and effective means for automatically or manually operating valve controlled means for supplying selective pressure to chuck operators. Obviously, the invention is not restricted to these specific structural details herein mentioned and numerous changes and modification, and the full use of equivalents, may be resorted to without departing from the spirit or scope of the appended claims.

Having set forth the nature of our invention, what we claim is:

1. In a machine tool, a rotary carrier, a plurality of chucks carried thereby, independent fluid means for operating said chucks, independent valves for each of said means, a plurality of sources of fluid pressure selectively applicable to said valves and means for operating said valves independently of the source of pressure applied thereto.

2. In a machine tool, a rotary carrier, a plurality of chucks carried thereby, independent fluid means for operating said chucks, independent valves for each of said means, a plurality of sources of fluid pressure selectively applicable to said valves and means for operating said valves independently of the source of pressure applied thereto, said means being automatically operable in response to movement of the carrier.

3. In a machine tool, an annular carrier, a column about which said carrier revolves, an annular recess in said carrier, means for dividing said recess into sub-chambers, means for independently supplying pressure to said sub-chambers, chucks carried by the carrier, fluid pressure operating means for said chucks and means operable by rotation of the carrier to selectively establish communication of said fluid pressure means with said sub-chambers.

4. In a machine tool, an annular carrier, a column about which said carrier revolves, an annular recess in said carrier, means for dividing said recess into sub-chambers, means for independently supplying pressure to said sub-chambers, chucks carried by the carrier, fluid pressure operating means for said chucks, means operable by rotation of the carrier to selectively establish communication of said fluid pressure means with said sub-chambers and means for varying the size of said sub-chambers.

5. In a machine tool, an annular carrier, a column about which said carrier revolves, an annular recess in said carrier, means for dividing said recess into sub-chambers, means for independently supplying pressure to said sub-chambers, chucks carried by the carrier, fluid pressure operating means for said chucks, means operable by rotation of the carrier to selectively establish communication of said fluid pressure means with said sub-chambers, means for varying the size of said sub-chambers and independent valves for each of said fluid pressure operating means for controlling the operation thereof independently of the source of fluid pressure therefor.

EDWARD P. BULLARD.
GUSTAF R. APPELBERG.